United States Patent
Born

[19]

[11] Patent Number: 6,115,771
[45] Date of Patent: Sep. 5, 2000

[54] METHOD AND SYSTEM FOR CONVERTING COMPUTER PERIPHERAL EQUIPMENT TO SCSI-COMPLIANT DEVICES

[75] Inventor: Richard M. Born, Fort Collins, Colo.

[73] Assignee: LSI Logic Corporation, Milpitas, Calif.

[21] Appl. No.: 09/052,715

[22] Filed: Mar. 31, 1998

[51] Int. Cl.[7] .................................................. G06F 13/42
[52] U.S. Cl. .......................... 710/129; 710/105; 370/466
[58] Field of Search ...................... 710/129, 105, 710/126, 128, 62, 131, 5; 709/230, 217, 253; 395/500.45; 711/100; 340/825.15; 370/466, 276, 296

[56] References Cited

U.S. PATENT DOCUMENTS

| | | | |
|---|---|---|---|
| 4,864,291 | 9/1989 | Korpi | 340/825.5 |
| 5,136,582 | 8/1992 | Firoozmand | 370/85.1 |
| 5,150,465 | 9/1992 | Bush et al. | 395/275 |
| 5,191,653 | 3/1993 | Banks et al. | 395/275 |
| 5,204,951 | 4/1993 | Keener et al. | 710/114 |
| 5,210,749 | 5/1993 | Firoozmand | 370/85.1 |
| 5,349,649 | 9/1994 | Ijima | 395/275 |
| 5,457,785 | 10/1995 | Kikinis et al. | 395/308 |
| 5,488,694 | 1/1996 | McKee et al. | 395/824 |
| 5,491,812 | 2/1996 | Pisello et al. | 395/500 |
| 5,499,378 | 3/1996 | McNeill, Jr. et al. | 395/500 |
| 5,535,197 | 7/1996 | Cotton | 370/60 |
| 5,572,676 | 11/1996 | Ohnishi | 395/200.2 |
| 5,590,313 | 12/1996 | Reynolds et al. | 395/500 |
| 5,610,914 | 3/1997 | Yamada | 370/395 |
| 5,644,577 | 7/1997 | Christensen et al. | 370/506 |
| 5,649,128 | 7/1997 | Hartley | 395/309 |
| 5,678,064 | 10/1997 | Kulik et al. | 395/848 |
| 5,680,592 | 10/1997 | Priem | 395/527 |
| 5,699,533 | 12/1997 | Sakai | 710/131 |
| 5,903,778 | 5/1999 | Chang | 710/62 |

*Primary Examiner*—Gopal C. Ray

[57] ABSTRACT

A method and system for converting computer peripheral equipment to SCSI-compliant devices includes an interface controller which converts a mass storage device communicating on an ATA interface to a target device communicating in SCSI commands across an IEEE-1394 interface. The controller converts SCSI commands in CDBs in the IEEE-1394 ORBs to ATA ORBs and then directly to ATA/ATAPI commands, through a mapping function.

19 Claims, 22 Drawing Sheets

| Signal | I/O | Description |
|---|---|---|
| DA(2:0) | O | Device Address: This is the 3-bit binary coded address asserted by the ATA host to access a register or data port in the device. |
| CS0b | O | Chip Select 0: This is the chip select signal from the ATA host used to select the Command Block registers. |
| CS1b | O | Chip Select 1: This is the chip select signal from the ATA host used to select the Control Block registers. |
| DIORb | O | Device I/O Read: This is the read strobe signal from the ATA host. |
| IORDY | I | I/O Channel Ready In: This signal is deasserted by the device when the current transfer is not ready to proceed. |
| DIOWb | O | Device I/O Write: This is the write strobe signal from the ATA host. |
| DD(15:0) | I/O | Device Data: This is the 8- or 16-bit data bus to/from the ATA device. Only the lower 8 bits are used for 8-bit register transfers. |
| DMACKb | O | DMA Acknowledge: This signal shall be used by the ATA host in response to DMARQ to initiate DMA transfers. |
| DMARQ | I | DMA Request: This signal shall be asserted by the ATA device when it is ready to perform a DMA transfer of data to or from the ATA host when a DMA operation has been enabled |
| RESETb | O | Device Reset: This signal from the ATA host signals a power on reset. The device will not respond to this signal being asserted for less than 20ns. |
| DASPb | I | Device Active: This signal can be sampled to determine if a device is active. |
| INTRQ | I | Device Interrupt: This signal is asserted to indicate to the ATA host that the ATA device needs to be serviced. |

*FIG. 4*

| DA(2:0) | Read | Write |
|---|---|---|
| 000 | Data(15:0) | Data(15:0) |
| 001 | Error | Features |
| 010 | Sector Count | Sector Count |
| 011 | Sector Number | Sector Number |
| 100 | Cylinder Low | Cylinder Low |
| 101 | Cylinder High | Cylinder High |
| 110 | Device/Head | Device/Head |
| 111 | Status | Command |

CS0 Registers Command Block

| DA(2:0) | Read | Write |
|---|---|---|
| 000 | | |
| 001 | | |
| 010 | | |
| 011 | | |
| 100 | | |
| 101 | | |
| 110 | Status* | Device Control |
| 111 | Device Address | |

CS1 Registers Control Block

FIG. 5

| Sense Key | Sense Code | Sense Qualifier | Description of Error |
|---|---|---|---|
| 1h | 17h | 01h | Recovered data with retries |
| 1h | 5Dh | 10h | SMART threshold exceeded |
| 2h | 00h | 00h | Not ready |
| 2h | 28h | 00h | Not ready to ready transition |
| 3h | 10h | 00h | ID CRC Error |
| 3h | 11h | 00h | Unrecovered read error |
| 3h | 12h | 00h | Address mark not found for ID field |
| 4h | 00h | 00h | Hardware error |
| 5h | 20h | 00h | Invalid command operation code |
| 5h | 21h | 00h | Logical block address out of range |
| 5h | 24h | 00h | Invalid field in command packet |
| 5h | 25h | 00h | Logical unit not supported |
| 5h | 26h | 00h | Invalid field in parameter list |
| 6h | 29h | 00h | Power on reset or bus device reset occurred |
| 6h | 5Ah | 01h | Media change requested |
| Bh | 00h | 00h | Aborted command |

FIG. 8

| Byte | Bit 7 | Bit 6 | Bit 5 | Bit 4 | Bit 3 | Bit 2 | Bit 1 | Bit 0 |
|---|---|---|---|---|---|---|---|---|
| 0 | PS | Reserved | PageCode (06h) | | | | | |
| 1 | PageLength (08h) | | | | | | | |
| 2 | Reserved | | | | | | | WCD |
| 3 | LogicalBlockSize (02h) | | | | | | | |
| 4 | LogicalBlockSize (00h) | | | | | | | |
| 5 | NumberOfLogicalBlocks (NLB4) | | | | | | | |
| 6 | NumberOfLogicalBlocks (NLB3) | | | | | | | |
| 7 | NumberOfLogicalBlocks (NLB2) | | | | | | | |
| 8 | NumberOfLogicalBlocks (NLB1) | | | | | | | |
| 9 | NumberOfLogicalBlocks (NLB0) | | | | | | | |

*FIG. 9*

| Byte | Bit 7 | Bit 6 | Bit 5 | Bit 4 | Bit 3 | Bit 2 | Bit 1 | Bit 0 |
|---|---|---|---|---|---|---|---|---|
| 0 | OpCode (12h) ||||||||
| 1 | Reserved ||||| | CmdDt | EVPD |
| 2 | Page or Operation Code ||||||||
| 3 | Reserved ||||||||
| 4 | AllocationLength ||||||||
| 5 | Reserved ||||||||
| 6 | Reserved ||||||||
| 7 | Reserved ||||||||
| 8 | Reserved ||||||||
| 9 | Reserved ||||||||
| 10 | Reserved ||||||||
| 11 | Reserved ||||||||

*Fig. 10*

| Byte | Bit 7 | Bit 6 | Bit 5 | Bit 4 | Bit 3 | Bit 2 | Bit 1 | Bit 0 |
|---|---|---|---|---|---|---|---|---|
| 0 | Peripheral Qualifier (0) | | | Peripheral Device Type (0) | | | | |
| 1 | RMB (0) | Reserved (0) | | | | | | |
| 2 | ISO/IEC Version (0) | | ECMA Version (0) | | | ANSI Version (0) | | |
| 3 | AERC (0) | TrmTsk (0) | NmACA (0) | Reserved (0) | Response Data Format (2) | | | |
| 4 | Additional Length (33$_h$) | | | | | | | |
| 5 | Reserved (0) | | | | | | | |
| 6 | Reserved (0) | EncServ (0) | VS (0) | MultiP (0) | MChngr (0) | ACKReq (0) | Addr32 (0) | Addr16 (0) |
| 7 | RelAdr (0) | WBus32 (0) | WBus16 (0) | Sync (0) | Linked (0) | TranSiz (0) | CmdQue (1) | VS (0) |
| 8 - 15 | Vendor ID ("SYMBIOS ") | | | | | | | |
| 16 - 31 | Product ID ("SYM13FW500-DISK ") | | | | | | | |
| 32 - 35 | Product Revision Level ("1.00") | | | | | | | |
| 36 - 55 | Vendor Specific (IdentWord[20-29]) | | | | | | | |

*Fig. 11*

| Byte | Bit 7 | Bit 6 | Bit 5 | Bit 4 | Bit 3 | Bit 2 | Bit 1 | Bit 0 |
|---|---|---|---|---|---|---|---|---|
| 0 | OpCode (55h) | | | | | | | |
| 1 | Reserved | | | | | PF (1) | Reserved | SP (0) |
| 2 | Reserved | | | | | | | |
| 3 | Reserved | | | | | | | |
| 4 | Reserved | | | | | | | |
| 5 | Reserved | | | | | | | |
| 6 | Reserved | | | | | | | |
| 7 | Parameter List Length (PLL1) | | | | | | | |
| 8 | Parameter List Length (PLL0) | | | | | | | |
| 9 | Reserved | | | | | | | |
| 10 | Reserved | | | | | | | |
| 11 | Reserved | | | | | | | |

*Fig. 12*

| Byte | Bit 7 | Bit 6 | Bit 5 | Bit 4 | Bit 3 | Bit 2 | Bit 1 | Bit 0 |
|---|---|---|---|---|---|---|---|---|
| 0 | OpCode (5A$_h$) ||||||||
| 1 | Reserved |||||||
| 2 | PC || PageCode ||||||
| 3 | Reserved ||||||||
| 4 | Reserved ||||||||
| 5 | Reserved ||||||||
| 6 | Reserved ||||||||
| 7 | Parameter List Length (PLL1) ||||||||
| 8 | Parameter List Length (PLL0) ||||||||
| 9 | Reserved ||||||||
| 10 | Reserved ||||||||
| 11 | Reserved ||||||||

*Fig. 13*

| PC | Type of Parameter |
|---|---|
| $00_b$ | Current Values |
| $01_b$ | Changeable Values |
| $10_b$ | Default Values |
| $11_b$ | Saved Values |

Fig. 14

| Byte | Bit 7 | Bit 6 | Bit 5 | Bit 4 | Bit 3 | Bit 2 | Bit 1 | Bit 0 |
|---|---|---|---|---|---|---|---|---|
| 0 | OpCode (28h) ||||||||
| 1 | Reserved ||| DPO | FUA | Reserved || RelAdr |
| 2 | Logical Block Address (LBA3) ||||||||
| 3 | Logical Block Address (LBA2) ||||||||
| 4 | Logical Block Address (LBA1) ||||||||
| 5 | Logical Block Address (LBA0) ||||||||
| 6 | Reserved ||||||||
| 7 | Transfer Length (TL1) ||||||||
| 8 | Transfer Length (TL0) ||||||||
| 9 | Reserved ||||||||
| 10 | Reserved ||||||||
| 11 | Reserved ||||||||

*Fig. 15*

| Byte | Bit 7 | Bit 6 | Bit 5 | Bit 4 | Bit 3 | Bit 2 | Bit 1 | Bit 0 |
|---|---|---|---|---|---|---|---|---|
| 0 | OpCode (1B$_h$) ||||||||
| 1 | Reserved ||||||| Immed |
| 2 | Reserved ||||||||
| 3 | Reserved ||||||||
| 4 | PowerCondition (PC) |||| Reserved || LoEj | Start |
| 5 | Reserved ||||||||
| 6 | Reserved ||||||||
| 7 | Reserved ||||||||
| 8 | Reserved ||||||||
| 9 | Reserved ||||||||
| 10 | Reserved ||||||||
| 11 | Reserved ||||||||

*Fig. 16*

| Byte | Bit 7 | Bit 6 | Bit 5 | Bit 4 | Bit 3 | Bit 2 | Bit 1 | Bit 0 |
|---|---|---|---|---|---|---|---|---|
| 0 | OpCode (35$_h$) ||||||||
| 1 | Reserved |||||| Immed | RelAdr |
| 2 | Logical Block Address (LBA3) ||||||||
| 3 | Logical Block Address (LBA2) ||||||||
| 4 | Logical Block Address (LBA1) ||||||||
| 5 | Logical Block Address (LBA0) ||||||||
| 6 | Reserved ||||||||
| 7 | Number of Blocks (NB1) ||||||||
| 8 | Number of Blocks (NB0) ||||||||
| 9 | Reserved ||||||||
| 10 | Reserved ||||||||
| 11 | Reserved ||||||||

*Fig. 17*

| Byte | Bit 7 | Bit 6 | Bit 5 | Bit 4 | Bit 3 | Bit 2 | Bit 1 | Bit 0 |
|---|---|---|---|---|---|---|---|---|
| 0 | OpCode (00h) ||||||||
| 1 | Reserved ||||||||
| 2 | Reserved ||||||||
| 3 | Reserved ||||||||
| 4 | Reserved ||||||||
| 5 | Reserved ||||||||
| 6 | Reserved ||||||||
| 7 | Reserved ||||||||
| 8 | Reserved ||||||||
| 9 | Reserved ||||||||
| 10 | Reserved ||||||||
| 11 | Reserved ||||||||

*Fig. 18*

| Byte | Bit 7 | Bit 6 | Bit 5 | Bit 4 | Bit 3 | Bit 2 | Bit 1 | Bit 0 |
|---|---|---|---|---|---|---|---|---|
| 0 | OpCode (2F$_h$) | | | | | | | |
| 1 | Reserved | | | DPO | Reserved | | BytChk | RelAdr |
| 2 | Logical Block Address (LBA3) | | | | | | | |
| 3 | Logical Block Address (LBA2) | | | | | | | |
| 4 | Logical Block Address (LBA1) | | | | | | | |
| 5 | Logical Block Address (LBA0) | | | | | | | |
| 6 | Reserved | | | | | | | |
| 7 | Transfer Length (TL1) | | | | | | | |
| 8 | Transfer Length (TL0) | | | | | | | |
| 9 | Reserved | | | | | | | |
| 10 | Reserved | | | | | | | |
| 11 | Reserved | | | | | | | |

*Fig. 19*

| Byte | Bit 7 | Bit 6 | Bit 5 | Bit 4 | Bit 3 | Bit 2 | Bit 1 | Bit 0 |
|---|---|---|---|---|---|---|---|---|
| 0 | OpCode (3Bh) ||||||||
| 1 | Reserved ||||| Mode |||
| 2 | BufferID ||||||||
| 3 | Buffer Offset (BOff2) ||||||||
| 4 | Buffer Offset (BOff1) ||||||||
| 5 | Buffer Offset (BOff0) ||||||||
| 6 | Parameter List Length (PLL2) ||||||||
| 7 | Parameter List Length (PLL1) ||||||||
| 8 | Parameter List Length (PLL0) ||||||||
| 9 | Reserved ||||||||
| 10 | Reserved ||||||||
| 11 | Reserved ||||||||

*Fig. 20*

| Byte | Bit 7 | Bit 6 | Bit 5 | Bit 4 | Bit 3 | Bit 2 | Bit 1 | Bit 0 |
|---|---|---|---|---|---|---|---|---|
| 0 | OpCode (2A$_h$) ||||||||
| 1 | Reserved ||||| DPO | FUA | Reserved | RelAdr |
| 2 | Logical Block Address (LBA3) ||||||||
| 3 | Logical Block Address (LBA2) ||||||||
| 4 | Logical Block Address (LBA1) ||||||||
| 5 | Logical Block Address (LBA0) ||||||||
| 6 | Reserved ||||||||
| 7 | Transfer Length (TL1) ||||||||
| 8 | Transfer Length (TL0) ||||||||
| 9 | Reserved ||||||||
| 10 | Reserved ||||||||
| 11 | Reserved ||||||||

*Fig. 21*

| Byte | Bit 7 | Bit 6 | Bit 5 | Bit 4 | Bit 3 | Bit 2 | Bit 1 | Bit 0 |
|---|---|---|---|---|---|---|---|---|
| 0 | OpCode (2E$_h$) ||||||||
| 1 | Reserved ||||| DPO | BytChk | RelAdr |
| 2 | Logical Block Address (LBA3) ||||||||
| 3 | Logical Block Address (LBA2) ||||||||
| 4 | Logical Block Address (LBA1) ||||||||
| 5 | Logical Block Address (LBA0) ||||||||
| 6 | Reserved ||||||||
| 7 | Transfer Length (TL1) ||||||||
| 8 | Transfer Length (TL0) ||||||||
| 9 | Reserved ||||||||
| 10 | Reserved ||||||||
| 11 | Reserved ||||||||

*Fig. 22*

METHOD AND SYSTEM FOR CONVERTING COMPUTER PERIPHERAL EQUIPMENT TO SCSI-COMPLIANT DEVICES

The present invention relates to a technique for converting computer peripheral equipment to improve communications with host computers and, in particular, the present invention relates to a method and system for converting computer peripheral equipment to devices able to communicate in Small Computer System Interface (SCSI) commands.

BACKGROUND OF THE INVENTION

In the personal computer industry, there is a growing trend and increased desire to attach external peripheral equipment or devices to the personal computer (PC). Such peripheral devices may include: (1) additional mass storage devices to supplement the storage devices provided internally in the PC enclosure, (2) more conveniently located mass storage devices such as CD-ROM drives and floppy disk drives located near the computer keyboard and computer display and possibly spaced apart from the main PC enclosure by as much as several meters; and (3) other peripheral devices such as imaging devices, scanners, and so forth.

Typically, mass storage devices communicate with the central processor of the PC through a well known communication protocol, known as ATA (which stands for AT Attachment). ATA is a remnant from the ISO bus of the well-known IBM AT computer systems. ATA is an eight-bit or sixteen-bit parallel bus which is relatively simple and well understood. Because ATA has been the standard storage device communication protocol for so many years, computer software and hardware manufacturers are well accustomed to operating in this protocol and the hardware and software related to such mass storage devices are well developed.

Unfortunately, ATA has several drawbacks which make its long-term continued use problematic as the standard communication protocol for computer peripheral equipment. First, the flat ribbon cable typically used for ATA applications is flimsy and has poor transmission characteristics. Second, ATA has a relatively low bandwidth compared to other communication protocols which have been more recently developed. The bandwidth is limited by the propagation delays along the ribbon cable and by the fact that the host and target at either end of the ribbon cable must be locked to each other during the communication process. Third, communication over ATA ribbon cables does not work well when the length of the ribbon cable is as much as a few meters or more. This is not surprising since the ATA standard was originally developed for short connections within a desktop computer enclosure and were not originally intended for more lengthy interconnections. Fourth, in the ATA communication protocol, data is transferred in a single-ended fashion over a single wire rather than differentially over a pair of wires. Each of these drawbacks makes the continued use of ATA ribbon cables for appreciable distances unlikely.

In the meantime, more recent personal computer designs have utilized an interface known as the Small Computer System Interface (SCSI). SCSI is a high-speed serial bus protocol that allows for the connection of up to sixteen devices together. Various SCSI specifications have been developed with different bit lengths and transfer rates. SCSI interconnections alleviate many of the disadvantages of the ATA communication links discussed above.

More recently, a transport layer called Serial Bus Protocol-2 (SBP-2) has been created. SBP-2 runs over an IEEE-1394 serial bus to allow for: (1) larger numbers of connected devices than SCSI, (2) longer, cheaper cables; and (3) better support of multimedia applications. Unfortunately, it will take several years for manufacturers of mass storage devices and other computer peripheral devices to completely adopt the IEEE-1394 communication protocols, as the ATA communication protocol is so well developed, ingrained, and inexpensive to implement.

Another communication protocol has recently been developed in an attempt to allow host computers to communicate with peripheral devices via IEEE-1394 compliant cables. This protocol, known as the "tailgate," includes ATA command descriptor blocks (CDBs) imbedded in the standard operational request blocks (ORBs) of the IEEE-1394 communication protocol. The drawback is that the host computer must supply software drivers to convert SCSI commands to ATA CDBs. Because of this unfortunate requirement, the tailgate standard does not help the manufacturers of host computers in the gradual transition to communicating directly with peripheral devices with SCSI commands.

It is against this background, and the desire to solve the problems of and improve on the prior art, that the above invention has been developed.

SUMMARY OF THE INVENTION

The present invention is directed to a conversion apparatus attachable to a peripheral device which operates on an ATA/ATAPI communication protocol, to allow the computer peripheral device to communicate in a SCSI communication protocol with a remote host computer to which the peripheral device can be attached. The conversion apparatus includes an input stage that delivers and receives data to and from the remote host computer in the SCSI communication protocol. The conversion apparatus also includes a mapping stage communicating with the input stage to convert between the SCSI and ATA/ATAPI communication protocols bi-directionally. The conversion apparatus further includes a transfer stage communicating with the mapping stage and delivering and receiving data to and from the peripheral device in the ATA/ATAPI communication protocol.

The mapping stage may include converting between SCSI CDBs and ATA commands, data, and status across an ATA interface. The mapping stage may further include an intermediate stage of converting to ATA CDBs. The data sent to and from the host computer may be sent across a communication link to which the input stage of the conversion apparatus is attachable, the communication link and the input stage being IEEE-1394 compliant. The input stage may include a physical layer and a link layer. The mapping stage may include a buffer in communication with an ATA sequencer in cooperation with a microprocessor and associated program memory. The transfer stage may include an ATA sequencer in communication with an input/output port attachable to an ATA interface cable.

The present invention is also directed to a computer system that includes a host computer having an input/output port for communicating in a SCSI communication protocol. The computer system also includes a communication link having at least two ends, with a first end connected to the input/output port of the host computer. The computer system further includes a peripheral device located at a spaced apart distance from the host computer, the device having an input/output port for communicating in an ATA communication protocol. An interface unit located and associated with the peripheral device is also included, the interface unit having two input/output ports, with one of the input/output ports of the interface unit being connected to the input/output port of the peripheral device and the other of the input/output ports of the interface unit being connected to the second end of the communication link. The interface unit converts bi-directionally between the SCSI and ATA communication protocols.

The communication link may be a serial bus. The communication link may be half-duplex. The communication link may be IEEE-1394 compliant. The input/output ports on each of the host computer and the interface unit which are connected to the communication link may each be IEEE-1394 compliant. The computer system may further include an ATA interface interconnecting the peripheral device and the interface unit.

The present invention is also directed to a method of interfacing between a host computer communicating in a SCSI communication protocol and a peripheral device communicating in an ATA communication protocol. The method includes the steps of: (a) providing a serial bus communication link between the host computer and the peripheral device, the communication link being IEEE-1394 compliant, (b) providing an interface adapter at the peripheral device to which the communication link is attached, the interface adapter converting bi-directionally between the SCSI and ATA communication protocols; and (c) allowing the peripheral device to communicate with the host computer through the combination of the interface adapter and the communication link.

The providing an interface adapter step may further include mapping between the SCSI and ATA communication protocols. The providing an interface adapter step may further include mapping between SCSI CDBs in the SCSI communication protocol and ATA interface signals in the ATA communication protocol by mapping to an intermediate stage of ATA CDBs.

The present invention is also directed to a mass storage device attachable to a computer via a communication link. The device includes a mass storage subassembly with an input/output port operating in an ATA communication protocol and an interface adapter attachable to the mass storage subassembly. The interface adapter is for communication to the mass storage subassembly in the ATA communication protocol. The interface adapter is attachable to the communication link to the computer for communication in the SCSI communication protocol. The interface adapter converts between the SCSI and ATA communication protocols to allow the computer to communicate with the mass storage device in the SCSI communication protocol.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings:

FIG. 4 is a table of the signals available on the ATA interface of FIG. 1.

FIG. 5 is a data chart showing a plurality of task file registers accessible across the ATA interface shown in FIG. 1.

FIG. 8 is a table showing the sense status which describes errors in the ATA interface or the mass storage device of FIG. 1.

FIG. 9 is a table showing the Device Parameters Page supported by the Mode Select and Mode Sense CDBs, shown in FIGS. 12 and 13.

FIG. 10 is a table showing the Inquiry CDB in the SCSI command set, as could appear in the ORB of FIG. 3.

FIG. 11 is a table showing the Inquiry Data Returned supported by the Inquiry CDB, shown in FIG. 10.

FIG. 12 is a table showing the Mode Select CDB in the SCSI command set, as could appear in the ORB of FIG. 3.

FIG. 13 is a table showing the Mode Sense CDB in the SCSI command set, as could appear in the ORB of FIG. 3.

FIG. 14 is a table showing the Page Control Field supported by the Mode Sense CDB, shown in FIG. 13.

FIG. 15 is a table showing the Read(10) CDB in the SCSI command set, as could appear in the ORB of FIG. 3.

FIG. 16 is a table showing the Start/Stop Unit CDB in the SCSI command set, as could appear in the ORB of FIG. 3.

FIG. 17 is a table showing the Synchronized Cache CDB in the SCSI command set, as could appear in the ORB of FIG. 3.

FIG. 18 is a table showing the Test Unit Ready CDB in the SCSI command set, as could appear in the ORB of FIG. 3.

FIG. 19 is a table showing the Verify(10) CDB in the SCSI command set, as could appear in the ORB of FIG. 3.

FIG. 20 is a table showing the Write Buffer CDB in the SCSI command set, as could appear in the ORB of FIG. 3.

FIG. 21 is a table showing the Write(10) CDB in the SCSI command set, as could appear in the ORB of FIG. 3.

FIG. 22 is a table showing the Write and Verify(10) CDB in the SCSI command set, as could appear in the ORB of FIG. 3.

DETAILED DESCRIPTION OF THE PREFERRED EMBODIMENTS

Figure 1:
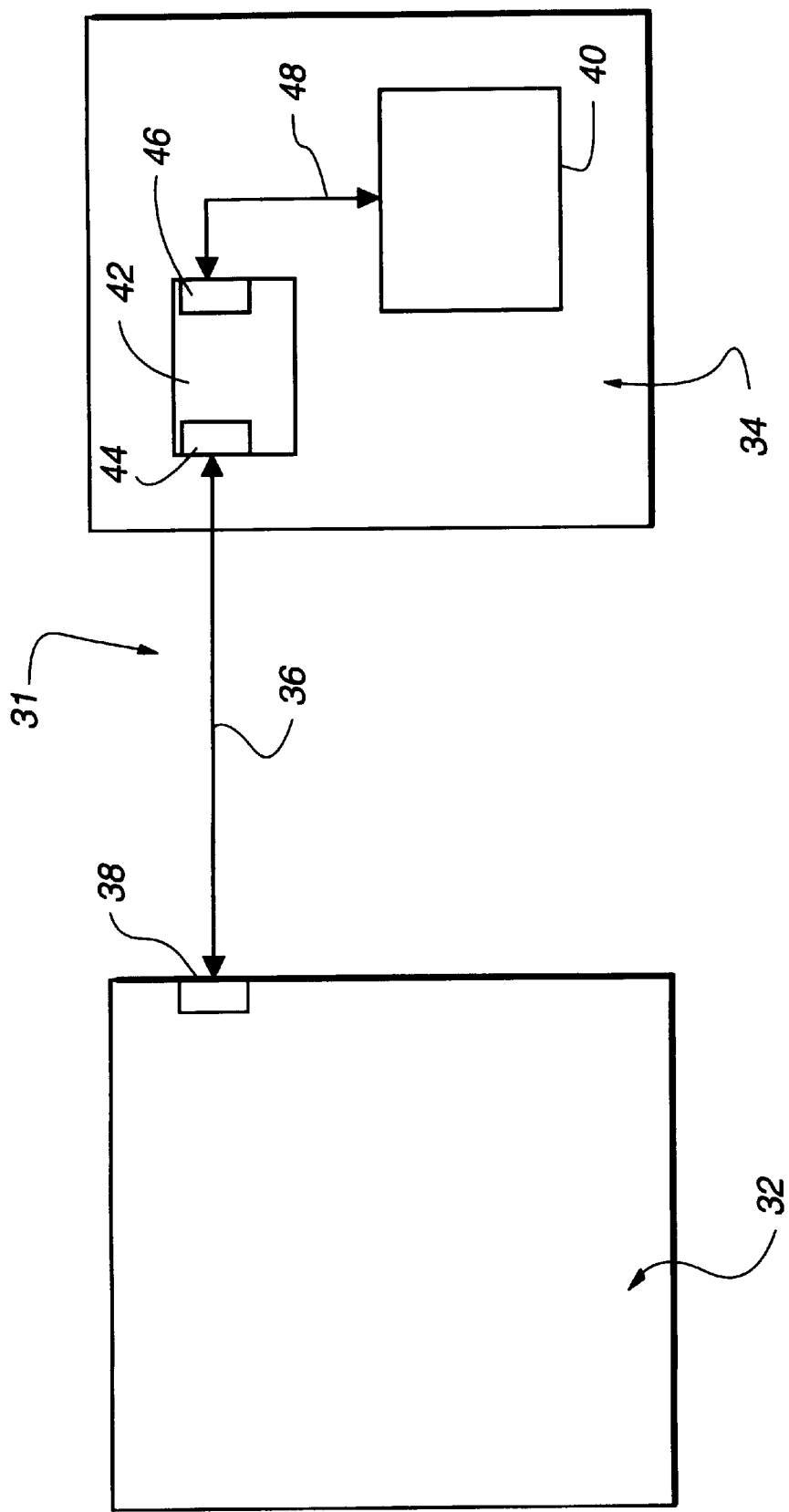
FIG. 1 is an overall block diagram of a computer system showing an interface controller of the present invention combined with a mass storage device to create a target storage device which can be communicated with by a host computer via an IEEE-1394 high-speed serial bus.

The present invention includes a computer system 31 with a host computer 32 communicating with a target device 34 over an IEEE-1394 compliant cable 36, as shown in FIG. 1. The host computer 32 could be any type of computer which communicates with peripheral equipment, such a as a desktop or laptop personal computer (PC). Preferably, the host computer 32 includes an input/output port 38 which meets the IEEE-1394 communication standard (supporting SBP-2 (serial bus protocol)) and to which the cable 36 can be attached.

The target device 34 can include any conventional peripheral device which is attachable to a computer, such as a mass storage device (including disk drives, floppy drives, tape drives, and optical media), scanners, printers, and digital imaging devices such as digital cameras. Alternatively, any other device capable of communication with a computer could be utilized. For ease of explanation throughout the remainder of this application, a mass storage device 40 such as a hard disk drive will be used by way of example. The mass storage device 40 is combined with an interface controller 42 of the present invention to create the target device 34. The host computer 32 acts as the initiating device when communicating with the target device 34.

The interface controller 42 includes at least two input/output ports 44 and 46, for communication with the host computer 32 and the mass storage device 40, respectively. The input/output port 44 meets the IEEE-1394 standard and is connectable to an opposite end of the cable 36 from the end connected to the host computer 32. The input/output port 46 meets the ATA standard and is connectable via an ATA interface 48 to the mass storage device 40. The ATA interface 48 can be a flat ribbon cable or a direct circuit connection.

Figure 2:
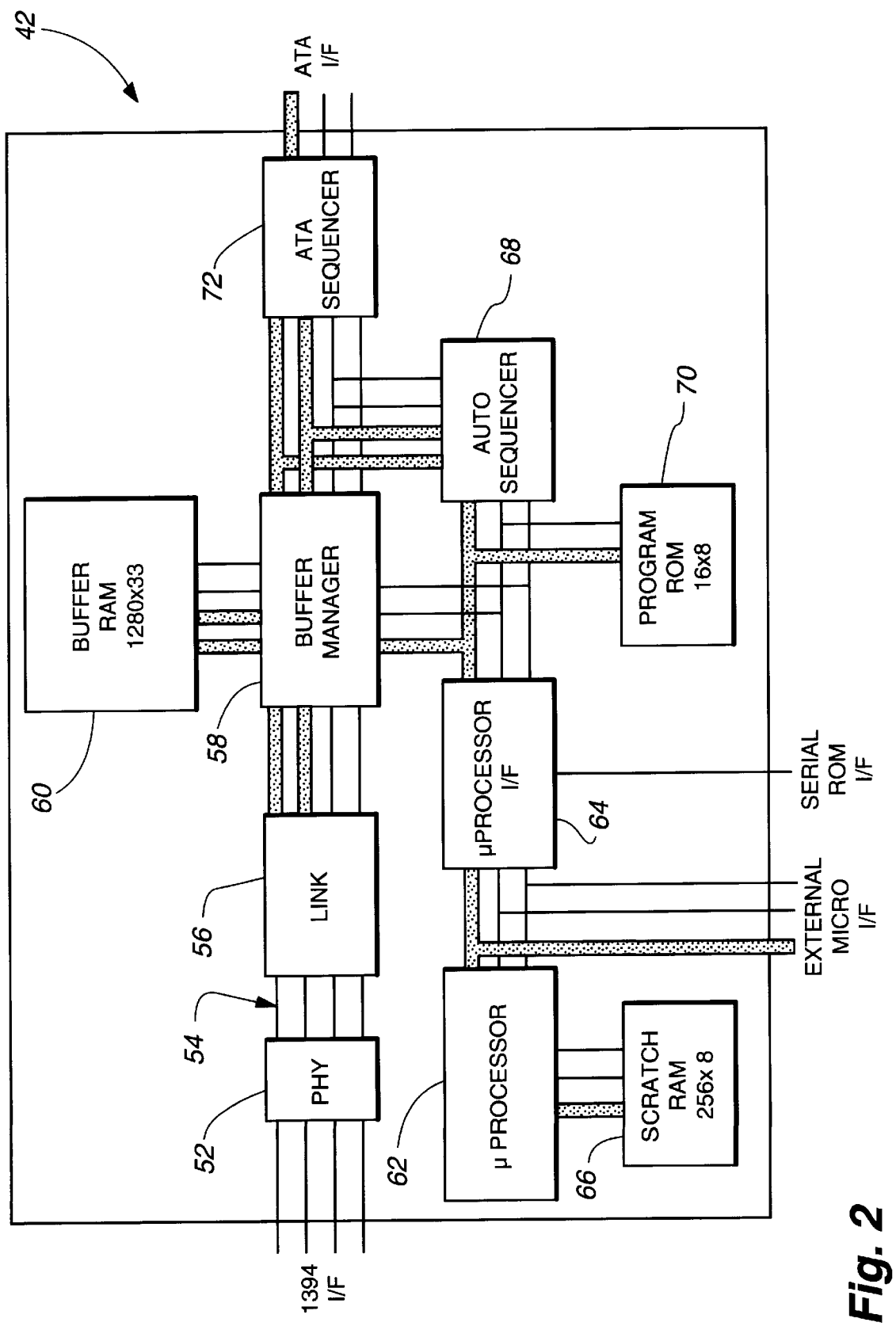
FIG. 2 is a block diagram of the interface controller of FIG. 1.

The major components of the interface controller are shown in FIG. 2. The interface controller 42 includes a conventional PHY 52 or physical layer for connection to the high-speed serial bus on the cable 36. The PHY 52 is connected by an eight-bit parallel bus 54 to a link 56 which serves as a protocol manager for formatting packets and assuring successful packet transmission/reception. The link 56 connects to a buffer manager 58 which cooperates with an associated buffer RAM 60, which may have a storage capacity of 1280×33. The buffer manager 58 communicates with a microprocessor 62 through a microprocessor interface 64. The microprocessor 62 is provided with a 256×8 scratch RAM 66. Alternatively, or as a supplement, an external microprocessor (not shown) could be connected to the microprocessor interface 64 for control of the interface controller 42. A 16k×8 program ROM 70 is also connected to the microprocessor interface 64 for storing microprocessor program code. An auto sequencer 68 is also attached to the buffer manager 58 and to an ATA sequencer 72 which provides the input/output port 46 for connection to the mass storage device 40 through the ATA interface cable 48. The auto sequencer 68 assists the microprocessor 62 and ROM 70 in sending transmit data and the fetching of Operational Request Block (ORB) lists. The ATA sequencer 72 is responsible for managing the ATA interface and the generation and processing of IEEE-1394 transactions for the data phase of the transfer that was programmed by the ORB. A bus interface unit (not shown) is partially represented in the auto sequencer 68 and partially represented in the ATA sequencer 72. Further detail on the components described above can be found in U.S. patent application Ser. No. 09/052,714 filed concurrently with this application and entitled "IEEE 1394-TO-ATA INTERFACE APPARATUS HAVING TRANSMIT AND RECEIVE FIFO QUEUES" and identified by its assignee Symbios Logic Inc. as Attorney Docket No. 98-051, each of which are assigned to the same assignee. The contents of the above-referenced patent application are incorporated by reference into this application.

Figure 3:
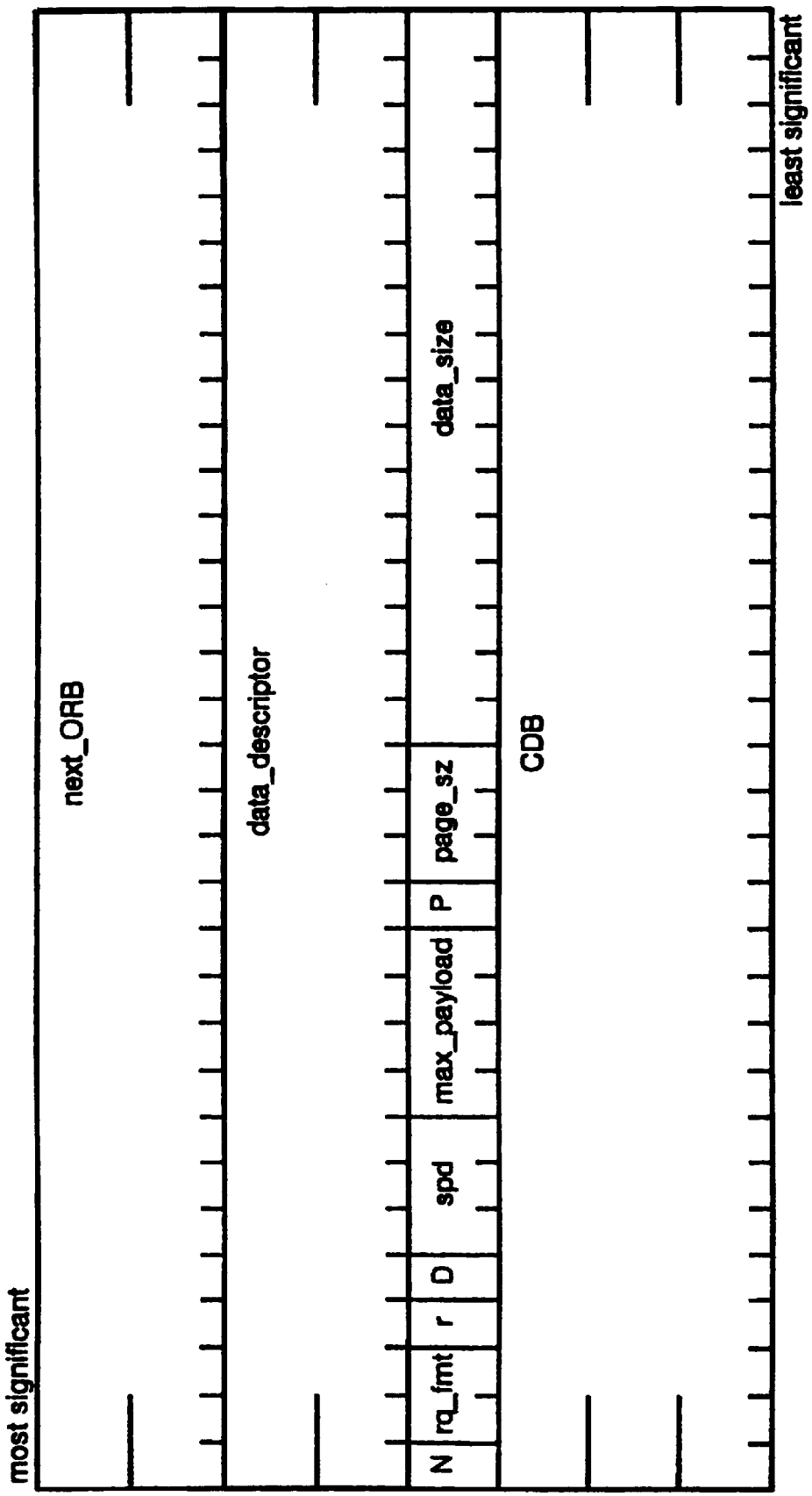
FIG. 3 is a data chart showing the bit format of an operational request block (ORB) as is used on the IEEE-1394 high-speed serial bus of FIG. 1.

The host computer 32 generates SCSI commands which are provided at the I/O port 38 for transmission across the cable 36 to the target device 34. At the target device 34, the interface controller 42 receives the SCSI commands through its I/O port 44. The SCSI commands are in the form of conventional 12-byte command descriptor blocks (CDB). Each CDB is included as part of a conventional operational request block (ORB), as is illustrated in FIG. 3. As can be seen, the ORB includes a eight-byte address pointing to the next ORB (next_ORB in FIG. 3). This is followed by an eight-byte data descriptor field (data_descriptor) which specifies, directly or indirectly, the address of a buffer in system memory. The next four bytes includes the notify bit (N), the two-bit request format field (rq_fmt), a reserved bit (r), the direction bit (D), the three-bit speed field (spd), the four-bit maximum payload field (max_payload), the page table present bit (P), the three-bit page size field (page_sz), and the sixteen-bit data size field. The last twelve bytes (the least significant bytes), are the CDB as described above. The CDB field contains the command descriptor block for the given command. Typical CDB formats are as shown in FIGS. 18, 20, and 21, and as discussed below in conjunction with the mapping function.

Figure 6:
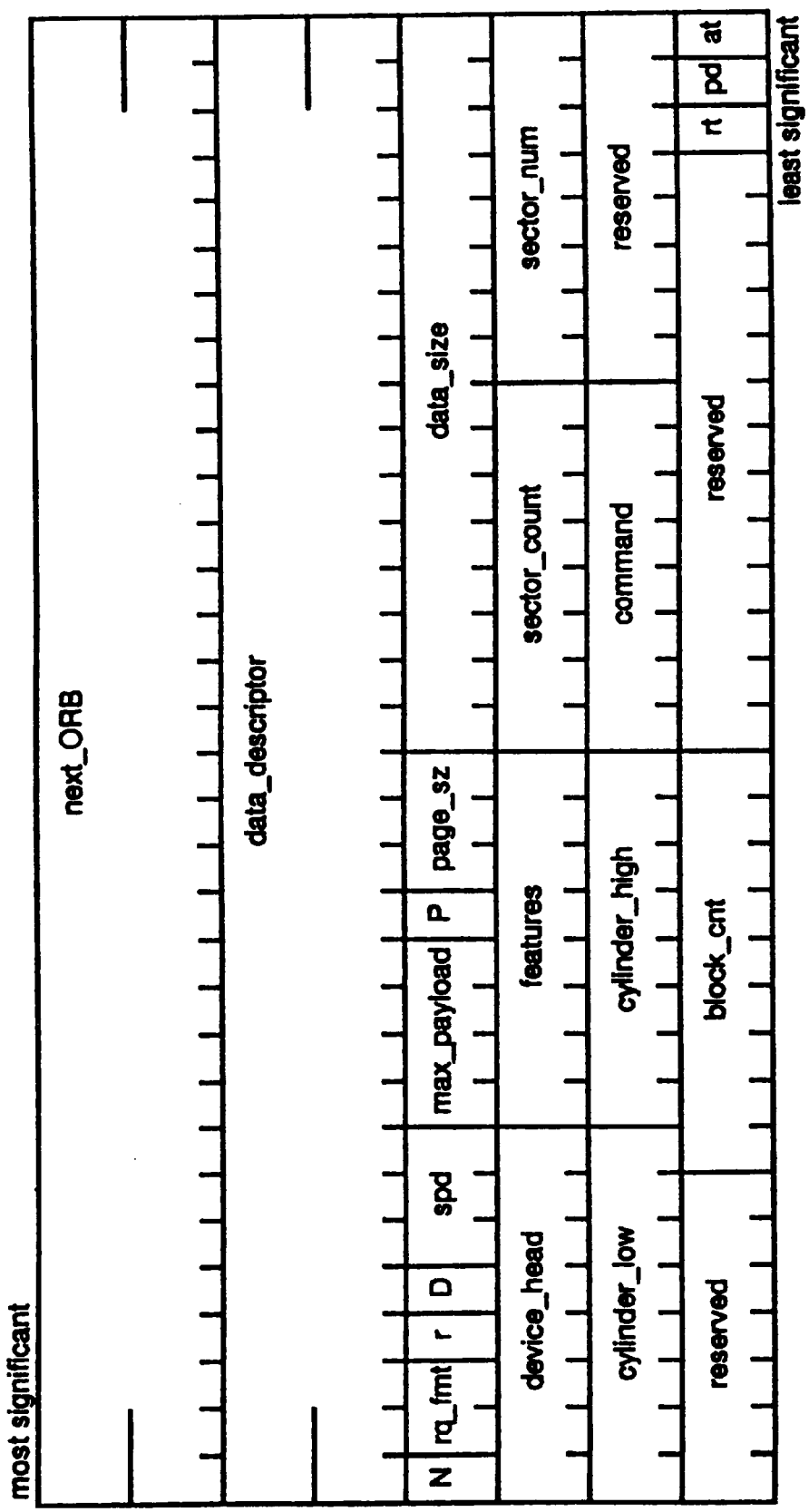
FIG. 6 is a data chart of an ATA CDB ORB used internally in the interface controller of FIG. 2.
Figure 7:
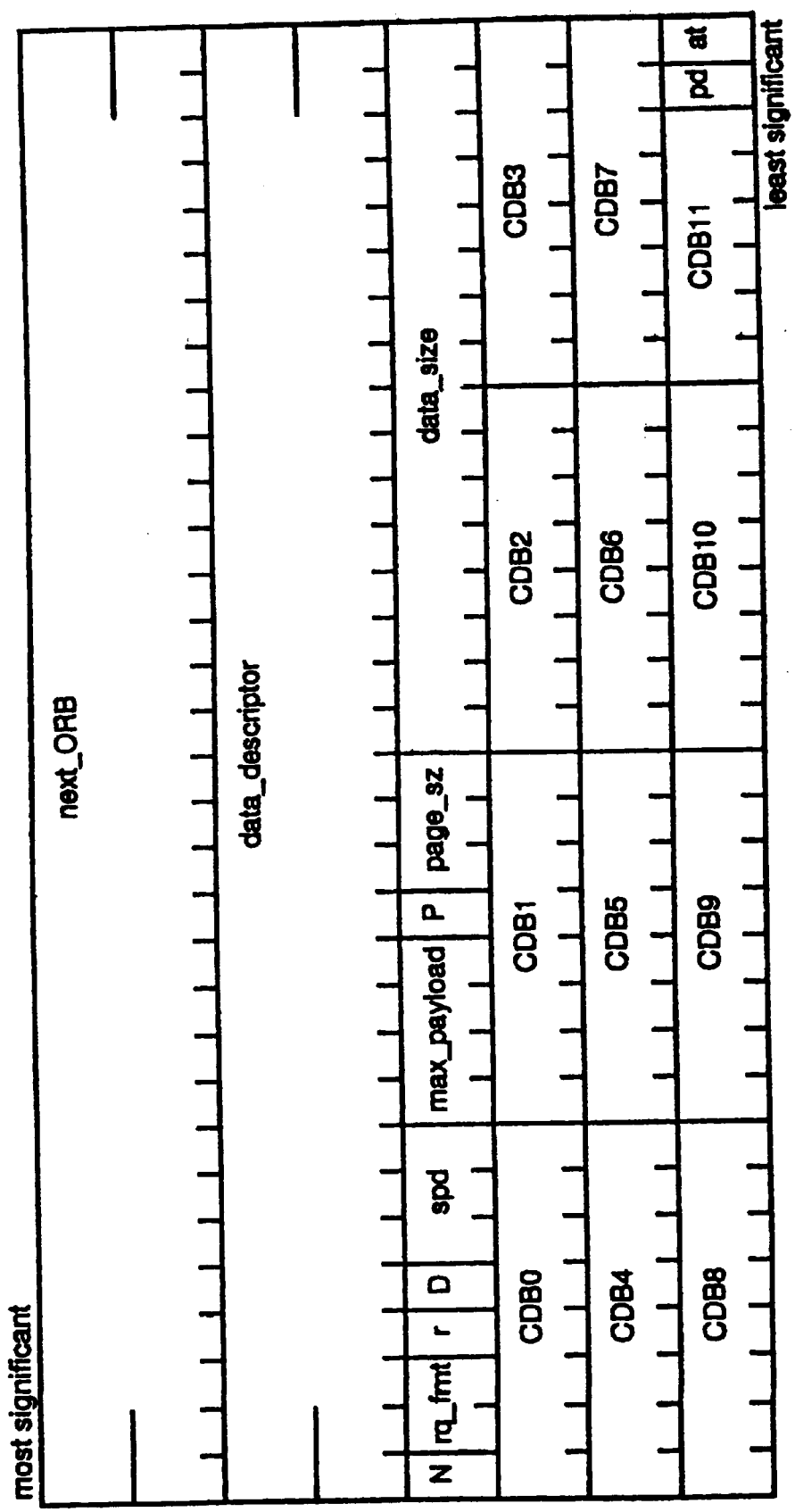
FIG. 7 is a data chart of an ATAPI CDB ORB which can be used internally in the interface controller of FIG. 2.

The interface controller 42 internally converts the SCSI command set to ATA or ATAPI CDBs such as are shown in FIGS. 6 and 7, respectively. This step is preferable for this embodiment, but is not a requirement. It would be possible to create a system falling within the spirit of the present invention which did not convert to ATA or ATAPI CDBs as an intermediate step. These ATA or ATAPI CDBs are converted to ATA/ATAPI commands across the ATA interface. Throughout this description, reference is made to the standard ATA/ATAPI commands which are defined in American National Standards Institute (ANSI) X3. T131153D, which is specifically incorporated herein by reference.

The signals available on the conventional ATA interface are as shown in FIG. 4. A set of command and control registers in the mass storage device 40, which are accessible across the ATA interface is shown in FIG. 5. A three-bit Device Address field, is used to select which of the registers is to be written to or read. A pair of Chip Select bits, are used to select either the command block registers or the control block registers to be written to or read, so as to select either the command block registers when CS0 is set and to select the control block registers when the CS1 bit is set. The ATA sequencer 72 of the interface controller 42 informs the mass storage device 40 of when a read or write is to be performed via the Device I/O Read or Device I/O Write signals. These bits are also known as the read strobe signal and write strobe signal. As seen in FIG. 4, sixteen of the lines across the ATA interface pass Device Data signals. Alternatively, eight bits at a time can be passed via register transfers. For DMA data transfers, a DMA Acknowledge signal and a DMA Request signal are used. Other signals on the interface include a Device Reset signal, a Device Active signal, a Device Interrupt signal, and an I/O Channel Ready signal.

Upon power up, the interface controller 42 must be able to determine the type of device (ATA/ATAPI) that is connected and configure itself and the connected device to use the ATA interface efficiently. The determination of the connected device could be done statically by a system integrator and have the interface controller 42 store the information regarding the connected device or dynamically by the interface controller 42 reading the power-on signature of the device (this will determine either ATA or ATAPI) followed by issuing an IDENTIFY DEVICE command or an IDENTIFY PACKET DEVICE command to determine the transfer mode of the ATA or ATAPI device, respectively. The interface controller 42 must then issue the SET FEATURES command to configure the device for the appropriate transfer mode.

For ATAPI peripheral devices (not shown), the execution agent is mainly pass-through. The CDB in the ORB is passed unmodified to the ATA sequencer 72 and then to the ATAPI device itself. If a command completes with error status, the execution agent will issue a REQUEST SENSE command to the ATAPI device in order to gather the sense information needed for the status block.

For the mass storage (ATA) device 40, the execution agent must translate the received CDB into the equivalent ATA commands. The paragraphs below describe how these commands are translated from the received CDB to the equivalent ATA commands. There is one exception to the fetch agent performing the translation. If bit-0 is set in the last byte of the CDB, the CDB is assumed to be an embedded ATA command and is formatted as illustrated in FIG. 9 and as such will pass directly to the ATA sequencer 72 without modification.

Mapping Function. When mapping commands from the host computer 32 onto the ATA command set, a sub-set of the actual commands and status messages can be supported. In order to map the ability of the target device 34 to report Unit Attention after a reset, a state variable is maintained by the interface controller 42 called BeenReset. This variable is set every time the mass storage (ATA) device 40 is reset and is cleared when the Unit Attention condition has been reported. The following sequence of pseudo-code describes the normal command execution and status processing sequence:

```
if (InvalidOpCode) then
        Return "Invalid command operation code"
elseif (BeenReset) then
        Return "Power on reset or bus device reset occurred"
        BeenReset = 0
elseif ((Status&88h) !=00h) then
        Return "Not ready"
else
        if (ParsingError)
                Return parsing status
        else
                Issue command
                if ((Status & A8h) !=0) then
                        Wait for upper level timeout
                elseif((Status & 01h) !=0) then
                        if ((Error & 80h) !=0) then
                                Return "Hardware error"
                        elseif((Error & 40h) !=0) then
                                Return "Unrecovered read error"
                        elseif((Error & 20h) !=0) then
                                Return "Not ready to ready transition"
                        elseif((Error & 10h) !=0) then
                                Return "ID CRC Error"
                        elseif((Error & 08h) !=0) then
                                Return "Media change requested"
                        elseif((Error & 04h) !=0) then
                                Return "Aborted Command"
                        elseif((Error & 01h) !=0) then
                                Return "Address mark not found for ID field"
                        else
                                Return "Aborted command"
                elseif((Status & 04h) !=0) then
                        Return "Recovered data with retries"
                endif
        endif
endif
```

If the command is successfully completed, a good status message is returned to the initiator following the IEEE-1394 protocol. If the command is rejected or completes with error, FIG. 8 describes the sense status that should be returned to describe the error. The Native hard-disk profile defines the following mode page that must be supported:

Device Parameters Page ($06_h$).

How this mode page is mapped to the mass storage (ATA) device 40 is described in the Mode Select and Mode Sense commands. The Device Parameters Page is intended to provide general configuration information of the device and to provide a method to modify that configuration as needed. The Device Parameters Page is illustrated in FIG. 9.

The Parameter Savable bit (PS) shall be set to indicate that the WCD field is savable. The Write CacheDisable (abbreviated as WCD, above) is provided to allow the host to enable or disable write caching. When this bit is equal to one, write caching is disabled. When this bit is equal to zero, write caching is enabled. The Logical Block Size field indicates the size of the logical blocks for the device. The Number of Logical Blocks field indicates the capacity of the device in units of blocks.

Inquiry. The Inquiry CDB, shown in detail in FIG. 10, provides a means for the initiator to determine a mass storage device type and other manufacture specific information. The Command support Data (abbreviated as CmdDt in FIG. 10), indicates that the interface controller 42 is to return the fields supported for the command specified in the Page or Operation Code field. The interface controller 42 does not support Command support Data and therefore the CmdDt bit must be zero. The Enable Vital Product Data (abbreviated as EVPD, above) indicates that the interface controller 42 is to return vital product data for the page specified in the Page or Operation Code filed. The interface controller 42 does not support Vital Product Data and therefore the EVPD bit must be zero.

Since neither the CmdDt or EVPD bits are set, the Page or Operation Code field is ignored by the interface controller 42. Allocation length indicates the size of the allocated buffer in bytes to store Inquiry information. Inquiry data is returned in the format shown in FIG. 11. When processing an Inquiry command, the following sequence will be followed (IdentWord[x] refers to which two-byte word in the IDENTIFY DEVICE response and will be padded by leading zeros or trailing spaces to fill the assigned region):

Issue IDENTIFY DEVICE(ECh) command

Reformat IDENTIFY DEVICE results in Inquiry data

Mode Select(10). The Mode Select CDB shown in detail in FIG. 12 provides a means for the initiator to specify device parameters to the mass storage device 40. The PF should always be set to indicate that the MODE SELECT parameter conform to the X3T9.2 SCSI standard. The SP bit indicates whether a page being selected should be saved or not. This bridging profile does not support savable pages and therefore this bit must be zero.

Device Parameters Page ($06_h$) When processing a Mode Select for the Device Parameters Page (FIG. 9), the following sequence will be followed:

```
if(WCD==1) then
        Issue SET FEATURE(EFh) command with Features = 82h
/*Disable Write Caching*/
        else
        Issue SET FEATURE(Efh) command with Features = 02h
/*Enable Write Caching*/
        endif
```

Mode Sense. The Mode Sense CDB, shown in detail in FIG. 13, provides a means for the initiator to determine a mass storage device's parameters. The Page Control field (PC) is used to determine the information returned for the Mode Sense CDB as shown in FIG. 14. The Page Code field is used to select the Mode page to report. The only supported mode pages defined for hard disks in the mass storage device profile is the Device Parameters Page ($06_h$). The only other supported Page Code is $3F_h$ which returns mode sense data for all supported pages.

Device Parameters Page ($06_h$). When processing a Mode Sense for the Device Parameters Page (FIG. 9), the following sequence will be followed (IdentWord[x] refers to which two-byte word in the IDENTIFY DEVICE response and will be padded by leading zeros or trailing spaces to fill the assigned region):

```
Issue IDENTIFY DEVICE(ECh) command
Reformat IDENTIFY DEVICE results into Mode Page data as follows;
if (PC==01_b) then /*Changeable values*/
    WCD=~(IdentWord[82], bit 5)
    LogicalBlockSize=0
    NumberOfLogicalBlocks=0
elseif(PC==10_b)then /*Default values*/
    WCD=~(IdentWord[85], bit 5)
    LogicalBlockSize=0200_h
    NumberOfLogicalBlocks=Identword[57-58]
else
    WCD=~(IdentWord[85], bit 5)
    LogicalBlockSize=0200_h
    NumberOfLogicalBlocks=IdentWord[60-61]
endif
```

Read(10). The Read(10) CDB, shown in detail in FIG. 15, provides the initiator a means to retrieve data stored at the specified logical block address (LBA). The Disable Page Out bit (DPO) is used to control the caching of the read information. Since there is no means to convey this information to the mass storage (ATA) device 40, this bit is ignored by the interface controller 42. The Force Unit Access bit (FUA) is used to force the device to fetch the read data from the media rather than from any cache. Since there is no means to convey this information to mass storage (ATA) device 40, this bit is ignored by the interface controller 42. The Relative Address bit (RelAdr) is used to indicate that the LBA field represents a two's complement offset from the previous linked read command. Linked commands are not supported by the bridging profile and therefore the RelAdr bit must be set to zero.

The Logical Block Address is used to indicate the starting block for the command. Since the mass storage (ATA) device 40 only supports a 28-bit logical block address, the command is rejected if LBA3[7:4]!=0. The Transfer Length indicates the number of blocks to transfer for the given command. Since the mass storage (ATA) device 40 can only support a maximum transfer of 256 blocks, the command is rejected if Transfer Length >256. To process the Read(10) command, the following sequence is performed:

```
if(PIO) then Issue READ SECTORS(20_h) command
else Issue READ DMA(C8_h) command
endif
```

Start/Stop Unit. The Start/Stop Unit CDB, shown in detail in FIG. 16, provides the initiator a means to alter the power state of the device. The Immediate bit (Immed) indicates when status should be returned for the command. Since the mass storage (ATA) device 40 only returns status upon completion of the commend, an error should be generated if this bit is set. The PowerCondition field allows the initiator to control the power state of the device. The LoEj bit allows the initiator to load or eject media. Since removable devices are not support, an error should be generated if this bit is set. The Start bit allows the initiator to control whether the device is spinning or not. This bit is ignored if the Power-Condition field is non-zero. To process the Start/Stop Unit command, the following sequence will be followed:

```
if(PC==0) then
    if(Start ==1) then
        Issue SEEK(70_h) command to LBA 0
    else
        Issue STANDBY IMMEDIATE(E0_h) command
    endif
elseif(PC==1) then/*Active State*/
    Issue SEEK(70_h) command to LBA 0
elseif(PC==2) then/*Idle */
    Issue IDLE IMMEDIATE(E1_h) command
elseif(PC==3) then/*Standby State*/
    Issue STANDBY IMMEDIATE(E0_h) command
elseif(PC==5) then/*Sleep State*/
    Issue SLEEP(E6_h) command
else
    Return error
endif
```

Synchronize Cache. The Synchronize Cache CDB, shown in detail in FIG. 17, provides the initiator a means to flush specified sectors from a cache on the mass storage device 40. The Immediate bit (Immed) indicates when status should be returned for the command. Since the mass storage (ATA) device 40 only returns status upon completion of the command, an error will be generated if this bit is set. The Relative Address bit (RelAdr) is used to indicate that the LBA field represents a two's compliment offset from the previous linked read command. This bit should be ignored by the device. The Logical Block Address field is used to indicate a starting point for a particular region of the cache information to get flushed. Since mass storage (ATA) device 40s only support the entire cache to be flushed, this field will be ignored. The Number Blocks field is used to indicate a size of a particular region of the cache information to get flushed. Since mass storage (ATA) device 40s only support the entire cache to be flushed, this field will be ignored. To process the Synchronize Cache command, the following sequence will be performed:

Issue FLUSH CACHE(E7_h) command

Test Unit Ready. The purpose of the Test Unit Ready CDB, shown in detail in FIG. 18, is to provide feedback to the initiator as to the status of the device and determine whether the mass storage device 40 is ready to accept a command. To process the Test Unit Ready command, the following sequence will be performed:

```
Issue SMART RETURN STATUS(B0_h, DA_h) command
    if (Command completes successfully && CylinderLow == F4h &&
CylinderHigh==2Ch)
    Return "SMART threshold exceeded" status
else
    Return normal completed status
```

Verify(10). The Verify(10) CDB, shown in detail in FIG. 19, provides the initiator a means to verify that data at the specified LBA is readable. The Disable Page Out bit (DPO) is used to control the caching of the write data. Since there is no means to convey this information to the mass storage (ATA) device 40, this bit must be zero. The Byte Check bit (BytChk) of zero requests a medium verification be performed with no data comparisons. A BytChk of one indicates that a byte-for-byte comparison is to be performed while the medium is being read. In order to reduce the buffer requirements for the interface controller 42, BytChk must be zero.

The Relative Address bit (RelAdr) is used to indicate that the LBA field represents a two's complement offset from the previous linked read command. Linked commands are not supported by the bridging profile and therefore the RelAdr bit must be set to zero. The Logical Block Address is used to indicate the starting block for the command. Since the mass storage (ATA) device 40 only supports a 28-bit logical block address, the command is rejected if LBA3[7:4]!=0. The Transfer Length indicates the number of blocks to transfer for the given command. Since the mass storage (ATA) device 40 can only support a maximum transfer of 256 blocks, the command is rejected if Transfer Length >256. To process the Verify(10) command, the following sequence is performed: Issue READ VERIFY SECTORS ($40_h$) command Write Buffer, Mode($101_b$)—Download Microcode and Save. The Write Buffer CDB, shown in detail in FIG. 20, with mode bits set to $101_b$, provides the initiator a means to download and store new microcode to the device. The Mode field indicates what type of buffer the command is attempting to write. The only supported value for the Mode field is $101_b$, which indicates Download Microcode and Save. The interface controller 42 must reject all commands with unsupported Mode fields. The Buffer ID field will be used to indicate whether the interface controller 42 is to download new microcode. A value of $FF_h$ indicates that the interface controller 42 should attempt to download its own microcode while any other value will be rejected. The Buffer Offset field should be set of $004000_h$ in this mode. The Parameter List Length shall be used to indicate the size of the microcode download in bytes. To process the Write Buffer command, the following sequence will be used:

if (BufferID==FFh) then
      Download local flash

Write(10). The Write(10) CDB, shown in detail in FIG. 21, provides the initiator a means to store data at the specified LBA. The Disable Page Out bit (DPO) is used to control the caching of the write data. Since there is no means to convey this information to the mass storage (ATA) device 40, this bit is ignored by the interface controller 42. The Force Unit Access bit (FUA) is used to force the mass storage device 42 to return status when the write data has been stored to the media rather than to any cache. This functionality will be supported by using different ATA commands based on whether the FUA bit is set or clear. The Relative Address bit (RelAdr) is used to indicate that the LBA field represents a two's complement offset from the previous linked read command. Linked commands are not supported by the bridging profile and therefore the RelAdr bit must be set to zero.

The Logical Block Address is used to indicate the starting block for the command. Since the mass storage (ATA) device 40 only supports 28-bit logical block addresses, the command is rejected if LBA3[7:4]!=0. The Transfer Length indicates the number of blocks to transfer for the given command. Since the mass storage (ATA) device 40 can only support a maximum transfer of 256 blocks, the command is rejected if Transfer Length >256. To process the Write(10) command, the following sequence is performed:

--- if (FUA) then
      Issue WRITE VERIFY($3C_h$) command
   elseif (PIO)
      Issue WRITE SBCTOR($30_h$) command
   else
      Issue WRITE DMA($CA_h$) command
   endif

---

Write and Verify(10). The Write and Verify(10) CDB, shown in detail in FIG. 22, provides the initiator a means to store data at the specified LBA and verify that it is readable. The LUN field permits an initiator to control multiple logical units through the command set. This bridging profile supports logical units by specifying multiple IEEE-1394 units requiring initiators to login to the separate logical units. Therefore, the LUN field must be zero. The Disable Page Out bit (DPO) is used to control the caching of the write data. Since there is no means to convey this information to the mass storage (ATA) device 40, this bit is ignored by the bridging device. The Byte Check bit (BytChk) of zero requests a medium verification be performed with no data comparisons. A BytChk bit of one indicates that a byte-for-byte comparison is to be performed while the medium is being read. In order to reduce the buffer requirements for the interface controller 42, BytChk must be zero.

The Relative Address bit (RelAdr) is used to indicate that the LBA field represents a two's complement offset from the previous linked read command. Linked commands are not supported by the bridging profile and therefore the RelAdr bit must be set to zero. The Logical Block Address is used to indicate the starting block for the command. Since the mass storage (ATA) device 40 only supports a 28-bit logical block address, the command is rejected if LBA3[7:4]!=0. The Transfer Length indicates the number of blocks to transfer for the given command. Since the mass storage (ATA) device 40 can only support a maximum transfer of 256 blocks, the command is rejected if Transfer Length >256. To process the Write and Verify(10) command, the following sequence is performed:

Issue WRITE VERIFY($3C_h$) command

Although reference has been made throughout this description to a mass storage device, the present invention is equally applicable to any other computer peripheral device which communicates with an ATA or ATAPI interface. Furthermore, the present invention is equally applicable if a different mapping function is used or if different commands are supported.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The invention claimed is:

1. A conversion apparatus attachable to a peripheral device which operates on an ATA/ATAPI communication protocol, to allow the computer peripheral device to communicate in a SCSI communication protocol with a remote host computer to which the peripheral device can be attached, the conversion apparatus comprising:

an input stage that delivers and receives data to and from the remote host computer in the SCSI communication protocol;

a mapping stage communicating with the input stage to convert between the SCSI and ATA/ATAPI communication protocols bi-directionally; and a transfer stage communicating with the mapping stage and delivering and receiving data to and from the peripheral device in the ATA/ATAPI communication protocol.

2. A conversion apparatus as defined in claim 1, wherein the mapping stage includes converting between SCSI CDBs and ATA commands, data, and status across an ATA interface.

3. A conversion apparatus as defined in claim 2, wherein the mapping stage further includes an intermediate stage of converting to ATA CDBs.

4. A conversion apparatus as defined in claim 1, wherein the data sent to and from the host computer is sent across a communication link to which the input stage of the conversion apparatus is attachable, the communication link and the input stage being IEEE-1394 compliant.

5. A conversion apparatus as defined in claim 1, wherein the input stage includes a physical layer and a link layer.

6. A conversion apparatus as defined in claim 1, wherein the mapping stage includes a buffer in communication with an ATA sequencer in cooperation with a microprocessor and associated program memory.

7. A conversion apparatus as defined in claim 1, wherein the transfer stage includes an ATA sequencer in communication with an input/output port attachable to an ATA interface cable.

8. A computer system, comprising:
    a host computer having an input/output port for communicating in a SCSI communication protocol;
    a communication link having at least two ends, with a first end connected to the input/output port of the host computer;
    a peripheral device located at a spaced apart distance from the host computer, the device having an input/output port for communicating in an ATA communication protocol; and
    an interface unit located and associated with the peripheral device, the interface unit having two input/output ports, with one of the input/output ports of the interface unit being connected to the input/output port of the peripheral device and the other of the input/output ports of the interface unit being connected to the second end of the communication link;
    wherein the interface unit converts bi-directionally between the SCSI and ATA communication protocols.

9. A computer system as defined in claim 8, wherein the communication link is a serial bus.

10. A computer system as defined in claim 8, wherein the communication link is half-duplex.

11. A computer system as defined in claim 8, wherein the communication link is IEEE-1394 compliant.

12. A computer system as defined in claim 11, wherein the input/output ports on each of the host computer and the interface unit which are connected to the communication link are each IEEE-1394 compliant.

13. A computer system as defined in claim 8, further including an ATA interface interconnecting the peripheral device and the interface unit.

14. A method of interfacing between a host computer communicating in a SCSI communication protocol and a peripheral device communicating in an ATA communication protocol, the method comprising the steps of:
    providing a serial bus communication link between the host computer and the peripheral device, the communication link being IEEE-1394 compliant;
    providing an interface adapter at the peripheral device to which the communication link is attached, the interface adapter converting bi-directionally between the SCSI and ATA communication protocols; and
    allowing the peripheral device to communicate with the host computer through the combination of the interface adapter and the communication link.

15. A method as defined in claim 14, wherein the providing an interface adapter step further includes mapping between the SCSI and ATA communication protocols.

16. A method as defined in claim 15, wherein the providing an interface adapter step further includes mapping between SCSI CDBs in the SCSI communication protocol and ATA interface signals in the ATA communication protocol by mapping to an intermediate stage of ATA CDBs.

17. A mass storage device attachable to a computer via a communication link, the device comprising:
    a mass storage subassembly with an input/output port operating in an ATA communication protocol; and
    an interface adapter attachable to the mass storage subassembly for communication in the ATA communication protocol, the interface adapter being attachable to the communication link to the computer for communication in the SCSI communication protocol, wherein the interface adapter converts between the SCSI and ATA communication protocols to allow the computer to communicate with the mass storage device in the SCSI communication protocol.

18. A mass storage device as defined in claim 17, wherein the communication link and the attachment of the interface adapter to the communication link are both IEEE-1394 compliant.

19. A mass storage device as defined in claim 17, wherein the communication from the computer to the mass storage device is half-duplex.

* * * * *